United States Patent
Baba et al.

(10) Patent No.: US 6,930,752 B2
(45) Date of Patent: Aug. 16, 2005

(54) IMAGE PROCESSING METHOD AND APPARATUS

(75) Inventors: Masahiro Baba, Kanagawa (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 10/628,367

(22) Filed: Jul. 29, 2003

(65) Prior Publication Data

US 2004/0160577 A1 Aug. 19, 2004

(30) Foreign Application Priority Data

Aug. 14, 2002 (JP) ..................................... P.2002-236431

(51) Int. Cl.[7] .......................... G03B 19/18; H04N 5/21
(52) U.S. Cl. ...................................... 352/38; 348/625
(58) Field of Search ........................... 352/38; 348/606, 348/625, 699; 382/266; 345/611

(56) References Cited

U.S. PATENT DOCUMENTS 5,973,755 A * 10/1999 Gabriel ....................... 348/699

FOREIGN PATENT DOCUMENTS

| JP | 8-185145 | 7/1996 |
| JP | 11-252409 | 9/1999 |

OTHER PUBLICATIONS

Otani, Machine translation of JP 08–185145, Jul. 16, 1996.*

* cited by examiner

*Primary Examiner*—Rodney Fuller
(74) *Attorney, Agent, or Firm*—Oblon, Spivak, McClelland, Maier & Neustadt, P.C.

(57) ABSTRACT

An image processing method includes: discriminating between a still picture area and a motion picture area in an input image; enhancing edges with a quantity of edge enhancement larger in the motion picture area than in the still picture area; and outputting the input image having the enhanced edges. The output having the enhanced edges is displayed on a display unit.

19 Claims, 5 Drawing Sheets

FIG. 1
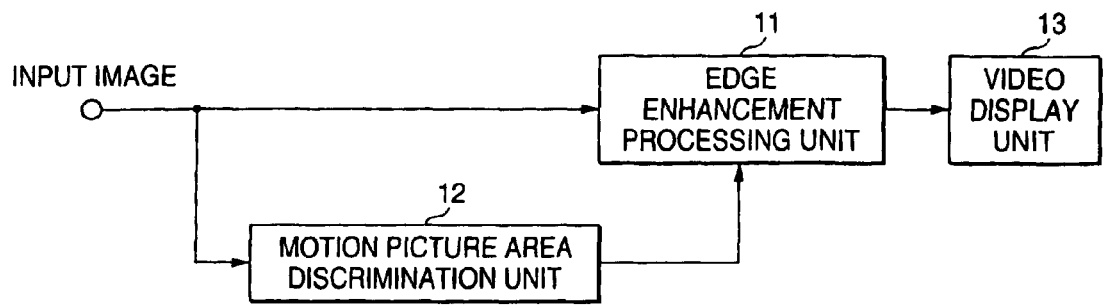
FIG. 2A
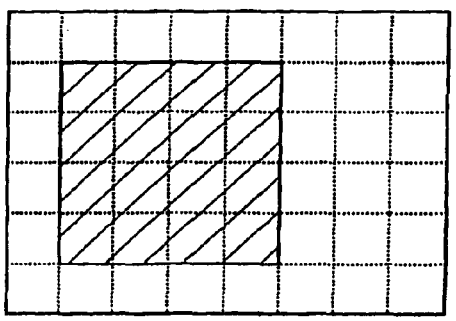
FIG. 2B
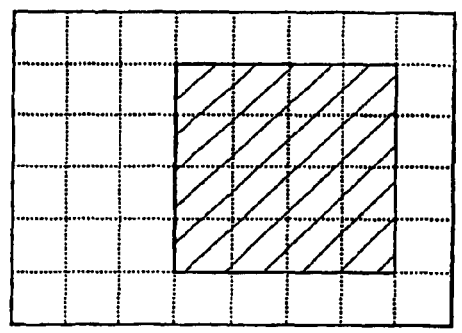
FIG. 3
| 0 | 0 | 0 | 0 | 0 | 0 | 0 | 0 |
|---|---|---|---|---|---|---|---|
| 0 | 0 | 0 | 1 | 1 | 1 | 1 | 0 |
| 0 | 0 | 0 | 1 | 1 | 1 | 1 | 0 |
| 0 | 0 | 0 | 1 | 1 | 1 | 1 | 0 |
| 0 | 0 | 0 | 1 | 1 | 1 | 1 | 0 |
| 0 | 0 | 0 | 0 | 0 | 0 | 0 | 0 |

IMAGE PROCESSING METHOD AND APPARATUS

The present disclosure relates to the subject matter contained in Japanese Patent Application No. 2002-236431 filed Aug. 14, 2002, which is incorporated herein by reference in its entirety.

BACKGROUND OF THE INVENTION

1. Field of the Invention

The present invention relates to an image processing method and apparatus.

2. Background Art

A typical imaging system accumulates, for example, images for one frame period and outputs the images as a one-frame picture. Thus, imaging blurring arises about a moving object.

That is, in an image, an edge of an object shows discontinuity in gradation. Assume that the object moves within the image. Even when the edge position moves, a distinct and clear image can be displayed if the edge is recorded and displayed as clear discontinuity in gradation.

In a typical imaging system, however, the motion of the object for one frame period is accumulated. Thus, the discontinuity in gradation expressing the edge is not recorded clearly, so there appears a gradation transition area having a fixed width in an image. This is blurring caused by imaging. Such blurring gives a sense of discomfort to an observer. Particularly, assume that an object observed as a distinct image when it stands still begins to move. In this case, as soon as the object moves, imaging blurring occurs so that a sense of distinction is lost suddenly. Thus, the sense of discomfort is great at the start of motion.

On the other hand, in a so-called hold type display such as a liquid crystal display (LCD), one and the same image is held and displayed for one frame period. Also in such a display, blurring of a moving object in an image is recognized by an observer due to the hold effect of eyes. Particularly, in the case of an LCD, blurring of the moving object occurs also due to its insufficient speed of response.

Therefore, in the related art, edge enhancement processing is performed to increase the sense of distinction (sharpness) of an image to be displayed when the image is displayed on a display such as a cathode ray tube (CRT) or an LCD.

As the method of edge enhancement processing, there are a method in which an edge of an input image is detected and a predetermined value is added to a video signal of the detected edge portion; a method in which the difference in gradation level between a pixel subject to edge enhancement processing and each pixel around the pixel is enhanced; and so on.

Further, as the method for applying different edge enhancement processing to still picture areas and motion picture areas, there is a method disclosed in Japanese Patent Laid-Open No. 185145/1996. According to this method, processing in which edge enhancement is not performed on any motion picture area is adopted to make the motion look smooth in the motion picture area.

However, when a motion picture with imaging blurring is displayed, the reduction of sharpness (blurring of edges) in the case where an object is moving is recognized conspicuously in comparison with the sharpness of the object in the case where the object stands still. This is due to the following reasons: When the object stands still, increase in the sharpness is attained by edge enhancement. On the other hand, when the object is moving, there occurs together the reduction of sharpness due to imaging blurring and the reduction of sharpness due to the fact that edge enhancement processing is not performed satisfactorily due to the reduction of sharpness caused by imaging blurring.

That is, in the related art, adequate researches have not been made as to how to perform edge enhancement processing to display a more natural picture image.

SUMMARY OF THE INVENTION

The invention may provide an image processing method including: discriminating between a still picture area and a motion picture area in an input image; enhancing edges with a quantity of edge enhancement larger in the motion picture area than in the still picture area; and outputting the input image having the enhanced edges.

The invention may also provide an image processing method including: dividing an input image into a plurality of areas; obtaining a motion velocity in each of the plurality of areas; setting a quantity of edge enhancement larger in a portion of the plurality of areas having a larger absolute value of the motion velocity; enhancing edges in the plurality of areas with the set quantity of edge enhancement; and outputting the input image having the enhanced edges.

The invention may provide an image processing method including: dividing an input image into a plurality of areas; obtaining a motion velocity in each of the plurality of areas; setting a quantity of edge enhancement in a portion of the plurality of areas having a larger absolute value of the motion velocity; calculating an absolute difference value of gradation for each of the pixels between an input image and an input image delayed for one frame period; enhancing edges in the plurality of areas with the set quantity of edge enhancement; and outputting the input image having the enhanced edges; wherein the steps of setting and enhancing are performed as to a pixel where the absolute difference value of gradation is larger than a predetermined value.

The invention may also provide a video displaying method including: discriminating between a still picture area and a motion picture area in an input picture; enhancing edges with a quantity of edge enhancement larger in the motion picture area than in the still picture area; and displaying an output picture having the enhanced edges.

Further, the invention may provide an image processing apparatus, including: a motion picture are a discrimination unit configured to discriminate between a still picture area and a motion picture area in an input image; and an edge enhancement processing unit configured to make a quantity of edge enhancement larger in the motion picture area than in the still picture area. Further, the invention may provide an image processing apparatus including: a motion picture area velocity discrimination unit configured to obtain a motion velocity in each of areas of an input image; and an edge enhancement processing unit configured to enhance edges in the areas with a quantity of edge enhancement, the quantity of edge enhancement set larger in a portion of the areas having a larger absolute value of the motion velocity.

Further, the invention may provide a video displaying apparatus including: a motion vector obtaining unit configured to obtain motion vector information in an input picture; an edge enhancement processing unit configured to enhance edges in the input picture with a quantity of edge enhancement, the quantity of edge enhancement set larger in an area having a larger absolute value of a motion velocity, the motion velocity obtained from the motion vector information; and a display unit that displays the input picture having the enhanced edges.

BRIEF DESCRIPTION OF THE DRAWINGS

The present invention may be more readily described with reference to the accompanying drawings:

FIG. 1 is a block diagram showing a first embodiment of the invention.

FIGS. 2A and 2B are graphs for explaining a moving object in an input image.

FIG. 3 is a table showing an example of motion picture area information in the first embodiment.

Figure 4A:
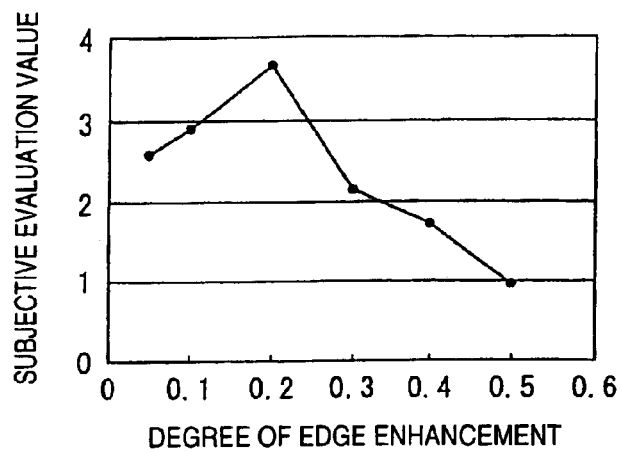
FIGS. 4A and 4B are graphs showing the relationship between the degree of edge enhancement and the subjective evaluation of picture quality in a motion picture area and in a still picture area.

DETAILED DESCRIPTION OF THE PREFERRED EMBODIMENTS (First Embodiment)

FIG. 1 shows a block diagram according to the first embodiment.

An input image is supplied to an edge enhancement processing unit 11 and a motion picture area discrimination unit 12.

The motion picture area discrimination unit 12 discriminates between motion picture areas and still picture areas, and supplies position information of the motion picture areas to the edge enhancement processing unit 11 as motion picture area information.

In the edge enhancement processing unit 11, edge enhancement processing is performed with different degrees of edge enhancement between the still picture areas and the motion picture areas of the input image on the basis of the motion picture area information.

After that, the image subjected to the edge enhancement processing is supplied to a video display unit 13 so as to be presented to an observer.

Next, the operation of each unit will be described.

The motion picture area discrimination unit 12 divides the input image into motion picture areas and still picture areas.

As the method for discriminating the motion picture areas, for example, there is a method in which edges of an input image are detected and compared with edge information of an input image delayed for one frame period, and any object whose edge has moved is regarded as a motion picture area while any area whose edge has not moved is regarded as a still picture area. In addition, in the case of MPEG movie or the like, on the basis of information of motion vectors supplied, a block whose motion vector is smaller in size than a threshold value may be regarded as a still picture while a block whose motion vector is not smaller in size than the threshold value is regarded as a motion picture. Thus, blocks corresponding to the motion vectors can be divided into still pictures and motion pictures. Even in the case of motion pictures other than MPEG movie, a motion vector can be obtained by the motion picture area discrimination unit when block matching is performed for every pixel or every area constituted by a plurality of pixels. Incidentally, when pixels or areas subject to block matching are narrow, information of pixels around the pixels or areas subject to block matching may be also used for block matching in order to improve the accuracy of block matching. Thus, the accuracy of motion vectors can be improved.

After the input image is divided into motion picture areas and still picture areas in such a manner, position information (coordinates) of the motion picture areas of the input image is set as motion picture area information.

For example, FIGS. 2A and 2B show an example of an image in which a box-like object has moved to the right on a screen. That is, FIG. 2B shows an input image, and FIG. 2A shows an image delayed for one frame period of FIG. 2B.

In this case, the motion picture area information may be information of 2 bits per pixel, as shown in FIG. 3. That is, 1 is set for any pixel judged as a motion picture area, and 0 is set for any pixel judged as a still picture area. Accordingly, the motion picture area information has a value of 1 in any motion picture object area (moving object area) of the input image and a value of 0 in any still picture area of the input image.

After that, the motion picture area information is supplied to the edge enhancement processing unit 11.

In the edge enhancement processing unit 11, edge enhancement processing is performed on the input image on the basis of the motion picture area information so that the degree of edge enhancement in the motion picture areas is made larger than that in the still picture areas.

Various methods can be considered as the method of edge enhancement processing. For example, the edge enhancement processing is performed in accordance with the following expression.

$$P_{l,m} = (1 + 8h)I_{l,m} - h\left(\sum_{x,y=l-1,m-1}^{l+1,m+1} I_{x,y} - I_{l,m}\right) \quad (1)$$

The expression (1) shows an expression for applying edge enhancement to gradation $I_{l,m}$ of a pixel in an x-y position (l,m). $P_{l,m}$ designates the gradation of the edge-enhanced pixel, and $\underline{h}$ designates the degree of edge enhancement. The larger the $\underline{h}$ is, the larger the quantity of edge enhancement is. That is, the expression (1) expresses the enhancement of a difference between a pixel subject to edge enhancement and each pixel around the pixel. Incidentally, when the number of display gradations is 256 in the video display unit, $P_{l,m}$ not smaller than 256 is rounded into 255, and $P_{l,m}$ smaller than 0 (that is, negative value) is rounded into 0.

Any pixel is surrounded by 8 pixels on the upper, lower, left, right and oblique sides of the pixel when the pixel is not located in an outmost of an image. For this reason, the factor of (1+8h) is used. However, as for a pixel located in the outmost of an image, apart of pixels around the pixel subject to edge enhancement are absent. For example, a pixel (position (1,1)) at the left upper end of the screen is present in a corner of the screen. Therefore, 5 pixels on the left lower, left, left upper, upper and right upper sides of the pixel subject to edge enhancement are absent. In such a case, "8" of (1+8h) in the expression (1) may be replaced by the total number of only the pixels present around the pixel subject to edge enhancement (in the case of the pixel in the position (1,1), "8" may be replaced by 3). Alternatively, there may be adopted a simple method in which edge enhancement is not performed on any pixel present in the outmost of an image.

When a pixel is enhanced by use of pixels present around the pixel, edge enhancement to be performed on the pixel in the left upper end of an image (position (1,1)) will be shown in Expression (2).

$$P_{1,1}=(1+3h)I_{1,1}-h(I_{2,1}+I_{1,2}+I_{2,2}) \quad (2)$$

In the edge enhancement processing unit, the quantity of edge enhancement can be controlled in accordance with the value of h in the expression (1). The quantity of edge enhancement for motion picture areas is set to be larger than that for still picture areas. For example, the value of $\underline{h}$ is set to be 0.2 for still picture areas while it is set to be 0.4 for motion picture areas.

Processing is performed on the input image with different degrees of edge enhancement between the still picture areas and the motion picture areas in accordance with the expression (1). The image subjected to the edge enhancement processing is supplied to the video display unit such as an LCD so as to be presented to an observer.

Next, description will be made on the effect of improving the picture quality when the degree of edge enhancement for the motion picture areas is made larger than that for the still picture areas.

Figure 4B:
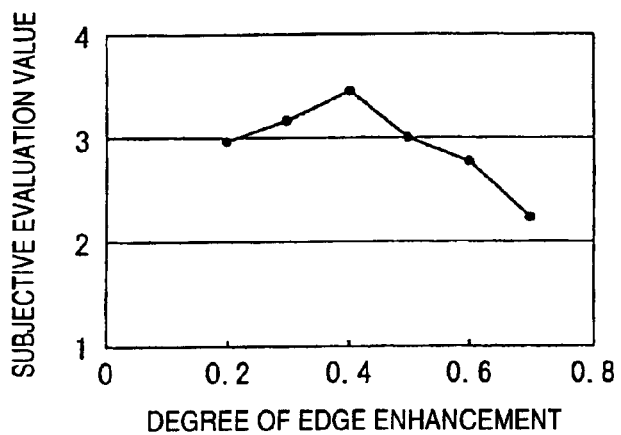

FIGS. 4A and 4B show a result of subjective evaluation of picture quality in a still picture and a motion picture. FIG. 4A shows the relationship between the degree of edge enhancement and the subjective evaluation value in a still picture area, and FIG. 4B shows the relationship between the degree of edge enhancement and the subjective evaluation value in a motion picture area. Here, the abscissa designates the degree of edge enhancement $\underline{h}$ in the expression (1), and the ordinate designates the subjective evaluation value. The higher the subject evaluation value is, the higher the picture quality is. Incidentally, an LCD was used as the video display unit.

From the result of FIG. 4A, the subjective evaluation value in the still picture area is the highest when the degree of edge enhancement is about 0.2. On the other hand, it is understood from FIG. 4B that the subjective evaluation value in the motion picture area is the highest when the degree of edge enhancement is about 0.4. That is, the degree of edge enhancement with which the subjective evaluation value has the highest value is higher in a motion picture than in a still picture.

Generally, the spatial frequency of a motion picture becomes lower due to imaging blurring than its original spatial frequency obtained when a human being recognizes an object moving actually. When the object stands still, there is no imaging blurring. Thus, the spatial frequency of a recorded image of the object is not lowered. Therefore, the lowering of the spatial frequency recognized by an observer becomes conspicuous when an object having stood still starts to move.

Here, the spatial frequency means a frequency distribution obtained by performing two-dimensional Fourier transform within one frame image (e.g., luminance image). Lowering of the spatial frequency means that high-frequency components of the spatial frequency are reduced. For example, in the case of an edge having discontinuity in luminance, plenty of high-frequency components are included in the spatial frequency distribution. However, in the case of a loosen edge with a continuous luminance distribution, the high-frequency components are reduced in the spatial frequency distribution.

Besides imaging blurring, when the video display unit is an LCD, motion picture blurring due to the speed of response occurs because the speed of response of a liquid crystal cannot follow the frame frequency of the motion picture satisfactorily. Thus, the spatial frequency of the motion picture to be displayed is lowered. As a result, an enough edge enhancement cannot be obtained with the same degree of edge enhancement as that in the still picture areas. That is, when the degree of edge enhancement in the motion picture areas is made larger than that in the still picture areas, the spatial frequency becomes close to the original spatial frequency to be provided for the motion picture areas, so that the sense of discomfort given to an observer is reduced.

As described above, when the degree of edge enhancement in the motion picture areas is made larger than that in the still picture areas, an image with a sense of distinction both in the still picture areas and in the motion picture areas can be presented to the observer.

Figure 10:
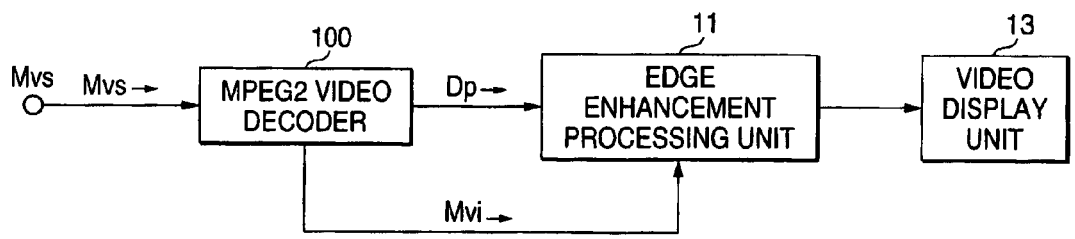
FIG. 10 is a block diagram showing an embodiment of the invention using motion vector information of MPEG2.

Incidentally, motion vector information of MPEG2 movie may be used in the method for discriminating motion picture areas. FIG. 10 shows an example of a configuration diagram in such a case. Here, as shown in FIG. 10, an MPEG2 video decoder 100 is provided as an input unit of an MPEG2 video stream Mvs. Motion vector information Mvi is extracted for each macroblock when decoding is performed by the MPEG2 video decoder 100. The motion vector information Mvi extracted by the MPEG2 video decoder 100 is supplied to the edge enhancement processing unit 11 together with a decoded image Dp. The edge enhancement processing unit 11 judges a macroblock to be a still picture when the scalar quantity of the supplied motion vector of the macroblock is smaller than a threshold value, and to be a motion picture when the scalar quantity is not smaller than the threshold value. Then, the edge enhancement processing unit 11 performs edge enhancement processing on each macroblock.

(Second Embodiment)

Figure 5:
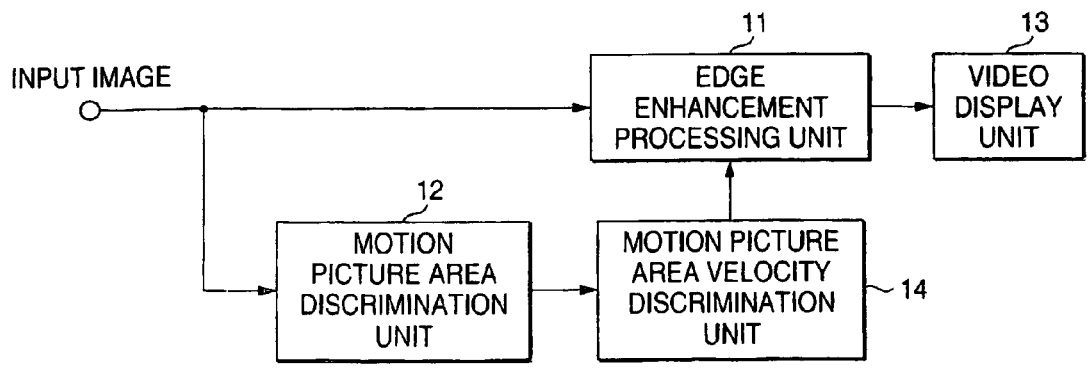
FIG. 5 is a block diagram showing a second embodiment of the invention.

FIG. 5 shows a block diagram of the second embodiment related to a video display method according to the invention. Incidentally, in FIG. 5, constituent units the same as those in FIG. 1 are denoted by the same reference numerals correspondingly, and duplicated description will be omitted.

The fundamental configuration is similar to that of the first embodiment, except that a motion picture area velocity discrimination unit 14 for discriminating a motion velocity for each moving object divided by the motion picture area discrimination unit 12 is added in this embodiment.

The positions and velocities of the motion picture areas obtained by the motion picture area velocity discrimination unit 14 are supplied to the edge enhancement processing unit 11 as motion picture area velocity information.

In the edge enhancement processing unit 11, edge enhancement processing in accordance with the motion velocities in the still picture areas and the motion picture areas is performed on the basis of the supplied motion picture area velocity information.

The image subjected to the edge enhancement processing is supplied to the video display unit 13 so as to be presented to an observer.

Next, the operation of each unit will be described.

The motion picture area velocity discrimination unit 14 obtains a motion velocity in each motion picture area obtained by the motion picture area discrimination unit 12. Here, the motion velocity means a value indicating a moving distance (dot) of a moving object in one frame period of an input image. As the method for obtaining the motion velocity, for example, the edge information of a moving object used in the motion picture area discrimination unit 12 is used. That is, the edge information of a moving object in an input image is compared with the edge information of an input image delayed for one frame period. Thus, the motion velocity can be obtained by obtaining the number of pixels with which the edge area has moved.

In the edge enhancement processing unit 11, edge enhancement processing is performed on the basis of the motion picture areas and the motion velocity in each of the motion picture areas obtained thus. As for the method of the edge enhancement processing, the expression (1) is used in the same manner as in the first embodiment. Incidentally, in this embodiment, the degree of edge enhancement h is determined in accordance with the motion velocity of each of the still picture areas and the motion picture areas so that the degree of edge enhancement h is increased in a motion picture area whose motion velocity is higher.

Figure 6:
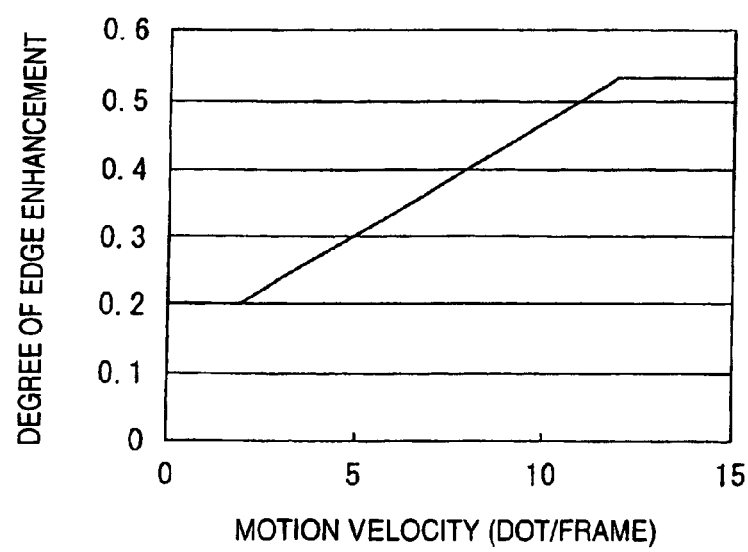
FIG. 6 is a graph showing the relationship between the motion velocity and the degree of edge enhancement in a motion picture area.

FIG. 6 shows a specific example of edge enhancement. Here, in FIG. 6, the abscissa designates the motion velocity (dot/frame) of a motion picture area, and the ordinate designates the degree of edge enhancement h. Incidentally, the relationship shown in FIG. 6 is an example, but may be determined suitably in accordance with the kind of device of the video display unit (such as an LCD or an organic EL display) or the speed of response of a liquid crystal.

In the example of FIG. 6, any area whose motion velocity is lower than about 2 dot/frame is regarded as a still picture, and the degree of edge enhancement h is set to be 0.2. On the other hand, any area whose motion velocity is not lower than about 2 dot/frame is regarded as a motion picture, and the degree of edge enhancement is increased in proportion to the motion velocity. Incidentally, when the motion velocity exceeds about 12 dot/frame, the degree of edge enhancement is made constant. This reason is as follows. That is, when the motion velocity is too high, human eyes cannot follow the moving object, and hence cannot observe the moving object closely. Thus, even if the degree of edge enhancement for the moving object is changed, no influence will be exerted on the picture quality. Here, the degree of edge enhancement is made constant in the moving object velocity of about 12 dot/frame or higher. Incidentally, the velocity of 12 dot/frame corresponds to the moving velocity of about 20 degrees/second when a 20-inch TV screen is observed at a distance four times as long as the screen height.

Such edge enhancement is performed for the following reason.

The lowering of the spatial frequency of a moving object due to imaging blurring is proportional to the increase of the motion velocity of the moving object. Accordingly, as the motion velocity of a moving object increases, the spatial frequency of a recorded image of the moving object is lower than the original spatial frequency with which the image should be recorded. Therefore, when the degree of edge enhancement h is increased in proportion to the increase of the motion velocity of a moving object, the spatial frequency of the moving object is closer to its original spatial frequency so that the sense of discomfort given to an observer can be reduced.

Accordingly, an input image is divided into still picture areas and motion picture areas, and the degree of edge enhancement is increased in motion picture areas whose motion velocities are higher. Thus, an image with a sense of distinction both in the still picture areas and in the motion picture areas can be presented to the observer.

In the method described above, an input image is divided into still picture areas and motion picture areas in advance, and the degree of edge enhancement is changed in the motion picture areas. However, when still pictures are regarded as moving objects whose motion velocities are 0 or not higher than a predetermined value (2 dot/frame in the example), the motion picture area discrimination unit can be omitted.

That is, when one frame image is divided into a plurality of areas in advance, and block matching is performed for each area, a motion velocity can be obtained. In such a manner, any area whose motion is slow can be handled as a still picture.

Incidentally, the motion velocity in each motion picture area may be obtained from the size of a motion vector of a moving object in the embodiment. To this end, for example, motion vector information for each macroblock is extracted when an MPEG2 video stream is decoded. The scalar quantity of the motion vector for each macroblock is set as a motion velocity of the macroblock. In this case, the configuration as shown in FIG. 10 is used preferably.

(Third Embodiment)

Also in this embodiment, the fundamental configuration is similar to that of the first embodiment. However, this embodiment is characterized in that the degree of edge enhancement for each pixel is determined in accordance with the size of a difference value of gradation for each pixel between an input image and an input image delayed for one frame period.

Figure 7:
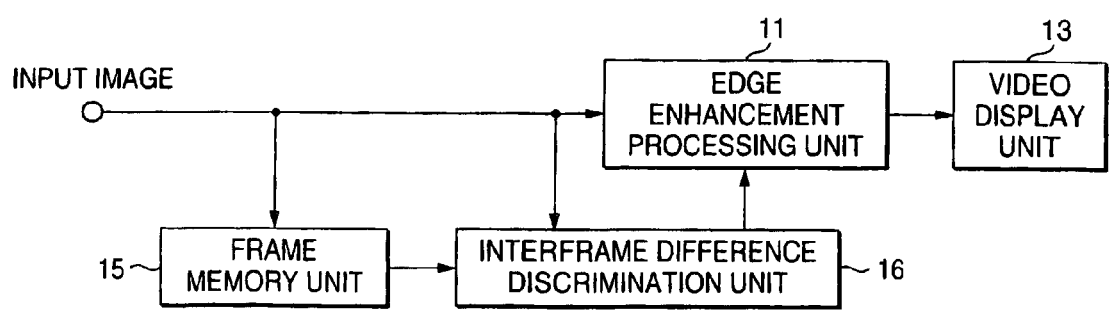
FIG. 7 is a block diagram showing a third embodiment of the invention.

FIG. 7 shows a block diagram of this embodiment. Here, parts the same as those in the previous embodiments are denoted by the same reference numerals correspondingly, and detailed description thereof will be omitted.

An input image is supplied to a frame memory unit 15 and an interframe difference discrimination unit 16.

In the frame memory unit 15, an image of one frame is held, delayed for one frame period, and supplied to the interframe difference discrimination unit 16.

The interframe difference discrimination unit 16 obtains an absolute difference value of gradation for each pixel between the input image and the image delayed for one frame period by the frame memory unit 15, the latter image being one frame before the former input image. It is judged whether the absolute difference value is larger than a predetermined value or not, and information of 2 bits per pixel is supplied to the edge enhancement processing unit as interframe difference information. In this 2-bit information, for example, 1 is set when the interframe difference value is larger than the predetermined value, and 0 is set when it is not larger.

In the edge enhancement processing unit 11, on the basis of the supplied interframe difference information, edge enhancement processing for a still picture is performed on each pixel when the interframe difference information for the pixel is 0. On the other hand, when the interframe difference information is 1, edge enhancement processing for a motion picture is performed with the degree of edge enhancement higher than that of a still picture. The image subjected to the edge enhancement processing is supplied to the video display unit 13 so as to be presented to an observer.

Figure 8A:
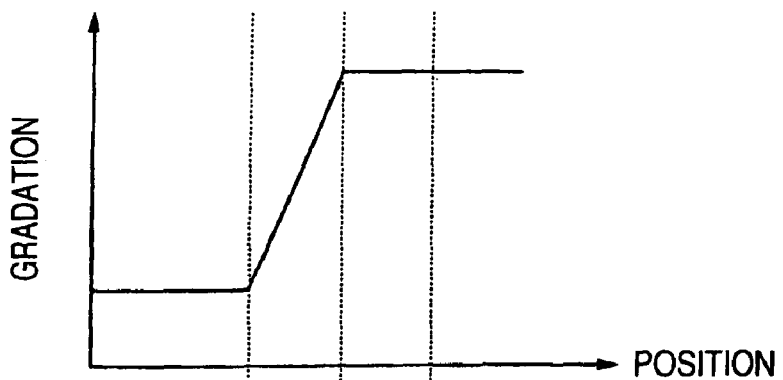
FIGS. 8A–8C are graphs for explaining detection of edge enhancement from an interframe difference value.
Figure 8B:
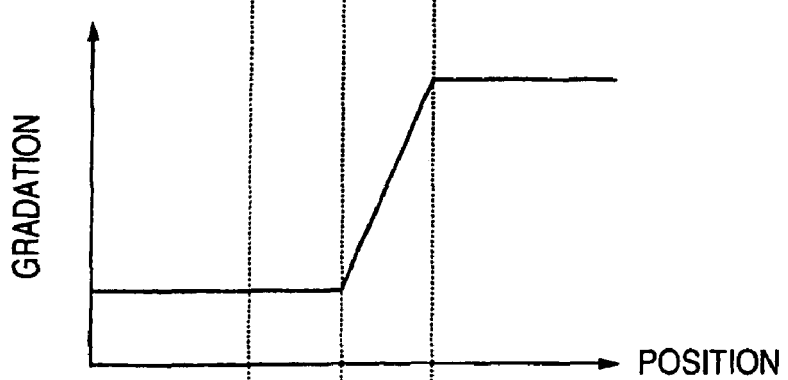
Figure 8C:
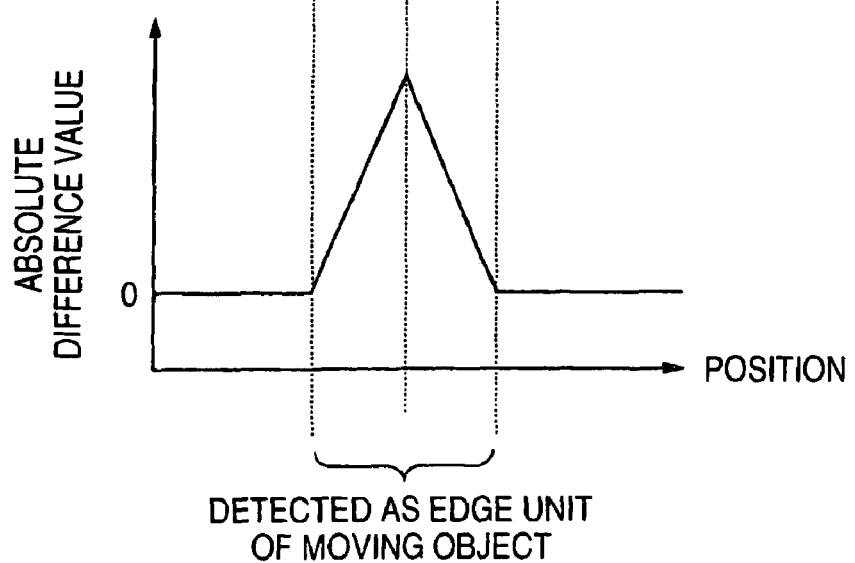

FIGS. 8A to 8C show an example of an edge portion of a moving object. In each of FIGS. 8A to 8C, the ordinate designates the gradation, and the abscissa designates the display position (here, horizontal pixel). FIG. 8A shows the relation to an input image delayed for one frame. FIG. 8B shows the relation to an input image. FIG. 8C shows the relation to an absolute difference value between FIGS. 8A and 8B. That is, FIGS. 8A to 8C show the state where a moving object having some gradation is scrolling horizontally on the background.

As shown in FIG. 8C, there appears a difference in gradation between the two frames, and the portion where the absolute difference value is not 0 is judged as an edge portion of the moving object. Although the interframe absolute difference value indicates a value is not 0, edge enhancement cannot be performed on any area that is not an edge portion in the input image. For example, one peak is detected as an edge portion of the moving object in FIG. 8C, while there is no edge portion in the left half area of the peak in the input image (FIG. 8B). The edge enhancement processing unit 11 performs enhancement with a larger quantity of edge enhancement only on the edge portion of the input image.

In addition, the quantity of enhancement for an edge portion whose absolute difference value is 0 is set to be smaller than that for the detected edge portion of the moving object.

The information of the moving object obtained by the interframe difference discrimination unit 16 is concerned with only the edge portions of the moving object. Fundamentally, even if the degree of edge enhancement is changed in any portion other than the edge portions, there will not appear a great change in the picture quality.

As described above, when only edge portions of a moving object obtained by the interframe difference discrimination unit is processed with the degree of edge enhancement greater than that for still pictures, an image with a sense of distinction can be presented to an observer.

(Fourth Embodiment)

The fundamental configuration of this embodiment is similar to that of the aforementioned embodiments. However, this embodiment is characterized in that an imaging/not-imaging judgment unit 17 is provided for judging whether an input image is imaged or not imaged, and the quantity of edge enhancement for a motion picture area is changed in accordance with the judgment as to whether the input image is imaged or not imaged.

Figure 9:
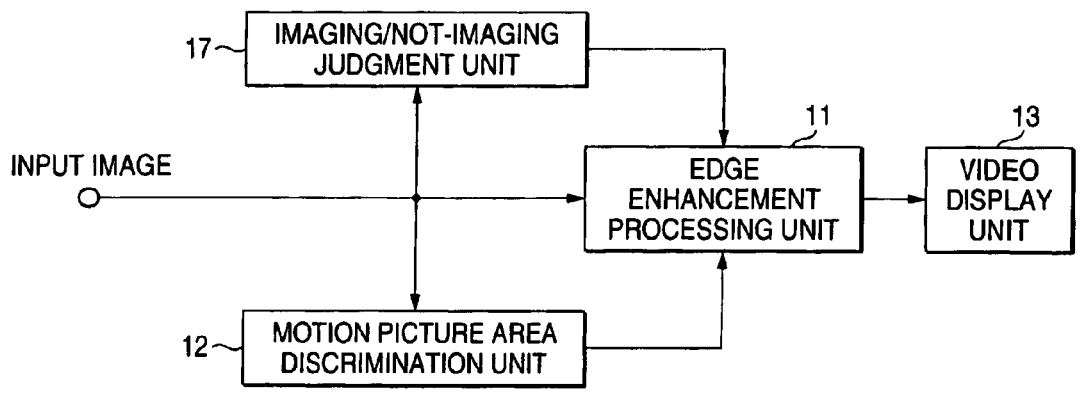
FIG. 9 is a block diagram showing a fourth embodiment of the invention.

FIG. 9 shows a block diagram of the fourth embodiment according to the invention. In this embodiment, the imaging/not-imaging judgment unit 17 is added to the first embodiment. Parts similar to those in the first embodiment are denoted by the same reference numerals correspondingly, and detailed description thereof will be omitted.

An input image is supplied to the imaging/not-imaging judgment unit 17 as well as the edge enhancement processing unit 11 and the motion picture area discrimination unit 12.

A plurality of methods for judging whether an input image is imaged or not imaged can be considered. For example, in this embodiment, the following method may be adopted. That is, an input image is judged as an imaged image when the input image is an image recorded in a DVD (Digital Versatile Disk) or a video tape because such an image is often an image of a movie or the like. On the other hand, when an input image is a game image, the input image is judged as a non-imaged image because it is a CG (Computer Graphics) image.

The imaging/not-imaging judgment unit 17 judges whether an input image is imaged or not imaged in such a method, and supplies the result to the edge enhancement processing unit as imaging/not-imaging information of the image.

In the edge enhancement processing unit 11, in the same manner as in the first embodiment, edge enhancement processing is performed with different quantities of edge enhancement on the still picture areas and the motion picture areas divided by the motion picture area discrimination unit 12. However, further in this embodiment, the quantity of edge enhancement for the motion picture areas is controlled on the basis of the imaging/not-imaging information from the imaging/not-imaging judgment unit 17. As for the relation of the size of the quantity of edge enhancement, the quantity of edge enhancement for the still picture areas is the smallest, the quantity of edge enhancement for the motion picture areas when the input image is not imaged is the next smallest, and the quantity of edge enhancement for the motion picture areas when the input image is imaged is the largest.

The quantity of edge enhancement is set thus for the following reason.

When an object is imaged, the high-frequency portion of the spatial frequency of the object is the largest in an image obtained by imaging the object standing still, it is the second largest in an image obtained by imaging the moving object without imaging blurring (e.g., an image picked up with a high-speed camera having a high-speed shutter device added to an image pick-up unit), and it is the smallest in an image obtained by imaging the moving object with imaging blurring by use of an ordinary camera. Therefore, when the quantity of edge enhancement for an image picked up by an ordinary camera in a motion picture area is made larger than that for a non-imaged image, the spatial frequency of the object in the motion picture area can be made close to its original spatial frequency.

The image whose edge has been enhanced by the edge enhancement processing unit 11 is supplied to the video display unit 13 so as to be presented to an observer.

As described above, the quantity of edge enhancement for motion picture areas is made larger than that for still picture areas, while the quantity of edge enhancement in the motion picture areas when an input image is imaged is made larger than that in the motion picture areas when the input image is not imaged. Thus, an image with a sense of distinction both in the still picture areas and in the motion picture areas can be presented to the observer.

Incidentally, in the first to fourth embodiments, another configuration may be adopted without departing from the scope and spirit of the invention. For example, the video display unit 13 may be separated from the configuration of the video display apparatus shown in FIGS. 1, 5, 7, 9 and 12. In this case, an image processing apparatus for performing a predetermined image processing is attained.

In addition, a program for attaining the functions in the first to fourth embodiments may be recorded in a computer-readable recording medium. In this case, the program recorded in the recording medium is read and executed by a computer system. Incidentally, the "computer system" mentioned here includes an operation system or hardware such as peripheral equipment.

In addition, the "computer system" includes a homepage providing environment (or display environment) when it uses a WWW system.

On the other hand, the "computer-readable recording medium" means a portable medium such as a flexible disk, a magneto-optical disk, a ROM or a CD-ROM, or a storage unit such as a hard disk included in the computer system. Further the "computer-readable recording medium" includes a medium for holding the program for a predetermined time, such as a volatile memory (RAM) in a computer system as a server or a client when the program is transmitted through a network such as the Internet or a communication circuit such as a telephone circuit.

In addition, the program maybe transmitted from a computer system storing the program in a storage unit or the like to another computer system through a transmission medium or by a transmitted wave in the transmission medium. Here, the "transmission medium" for transmitting the program means a medium having a function of transmitting information, including a network (communication circuit) such as the Internet or a communication circuit (communication line) such as a phone line.

In addition, the program may be prepared for attaining a part of the aforementioned functions. Further, the program may be a so-called difference file (difference program) which can attain the aforementioned functions in combination with a program which has been already recorded in the computer system.

Further, these modifications may be used selectively and suitably in combination.

As has been described above, according to the invention, an image with a sense of distinction both in the still picture areas and in the motion picture areas can be presented to the observer.

What is claimed is:

1. An image processing method comprising:
    discriminating between a still picture area and a motion picture area in an input image;
    enhancing edges with a quantity of edge enhancement larger in the motion picture area than in the still picture area; and
    outputting the input image having the enhanced edges.

2. The image processing method as claimed in claim 1, wherein the motion picture area is specified on the basis of an edge-moving area in the input image.

3. The image processing method as claimed in claim 1, wherein the discriminating step is performed by using a motion vector in the input image.

4. The image processing method as claimed in claim 3, wherein the input image is encoded into any one of MPEG-1, 2 and 4; and the motion vector is obtained by decoding the input image.

5. The image processing method as claimed in claim 3, wherein the motion vector is obtained by performing a block matching between the input image and the input image delayed for one frame period as to at least a portion of the input image.

6. The image processing method as claimed in claim 1, further comprising: judging whether the input image is imaged or not imaged;
    wherein the quantity of edge enhancement for the input image that is judged as an imaged input image is set larger than the quantity of edge enhancement for the input image that is not judged as an imaged input image.

7. An image processing method comprising:
    dividing an input image into a plurality of areas;
    obtaining a motion velocity in each of the plurality of areas;
    setting a quantity of edge enhancement larger in a portion of the plurality of areas having a larger absolute value of the motion velocity;
    enhancing edges in the plurality of areas with the set quantity of edge enhancement; and
    outputting the input image having the enhanced edges.

8. The image processing method as claimed in claim 7, further comprising:
    judging whether the input image is imaged or not imaged;
    wherein the quantity of edge enhancement for the input image that is judged as an imaged input image is set larger than the quantity of edge enhancement for the input image that is not judged as an imaged input image.

9. An image processing method comprising:
    dividing an input image into a plurality of areas;
    obtaining a motion velocity in each of the plurality of areas;
    setting a quantity of edge enhancement in a portion of the plurality of areas having a larger absolute value of the motion velocity;
    calculating an absolute difference value of gradation for each of the pixels between an input image and an input image delayed for one frame period;
    enhancing edges in the plurality of areas with the set quantity of edge enhancement; and
    outputting the input image having the enhanced edges;
    wherein the steps of setting and enhancing are performed as to a pixel where the absolute difference value of gradation is larger than a predetermined value.

10. The image processing method as claimed in claim 9, further comprising:
    judging whether the input image is imaged or not imaged;
    wherein the quantity of edge enhancement for the input image which is judged as an imaged input image is set larger than the quantity of edge enhancement for the input image which is not judged as an imaged input image.

11. A video displaying method comprising:
    discriminating between a still picture area and a motion picture area in an input picture;
    enhancing edges with a quantity of edge enhancement larger in the motion picture area than in the still picture area; and
    displaying an output picture having the enhanced edges.

12. The video displaying method as claimed in claim 11, wherein the discriminating step includes:
    detecting edge information from the input picture;
    comparing the edge information with an edge information of the input picture delayed for one frame period to detect an edge-moving area; and
    specifying the motion picture area on the basis of the edge-moving area.

13. The video displaying method as claimed in claim 11, wherein the discriminating step includes:
    dividing the input picture into a plurality of areas; and
    obtaining a motion velocity in each of the plurality of areas.

14. The video displaying method as claimed in claim 13, wherein the motion velocity is obtained on the basis of motion vector information of the input picture.

15. An image processing apparatus, comprising:
    a motion picture area discrimination unit configured to discriminate between a still picture area and a motion picture area in an input image; and
    an edge enhancement processing unit configured to make a quantity of edge enhancement larger in the motion picture area than in the still picture area.

16. An image processing apparatus comprising:
    a motion picture area velocity discrimination unit configured to obtain a motion velocity in each of areas of an input image; and
    an edge enhancement processing unit configured to enhance edges in the areas with a quantity of edge enhancement, the quantity of edge enhancement set larger in a portion of the areas having a larger absolute value of the motion velocity.

17. The image processing apparatus as claimed in claim 16, wherein the edge enhancement processing unit sets the quantity of edge enhancement constant when an absolute value of the motion velocity is larger or less than a predetermined value.

18. A video displaying apparatus comprising:

a motion vector obtaining unit configured to obtain motion vector information in an input picture;

an edge enhancement processing unit configured to enhance edges in the input picture with a quantity of edge enhancement, the quantity of edge enhancement set larger in an area having a larger absolute value of a motion velocity, the motion velocity obtained from the motion vector information; and a display unit that displays the input picture having the enhanced edges.

19. The video displaying apparatus as claimed in claim 18, wherein the edge enhancement processing unit sets the quantity of edge enhancement according to a characteristic of the display unit.

* * * * *